United States Patent
Wagner et al.

(10) Patent No.: US 11,128,011 B2
(45) Date of Patent: Sep. 21, 2021

(54) RECHARGEABLE BATTERY PACK

(71) Applicant: Andreas Stihl AG & Co. KG, Waiblingen (DE)

(72) Inventors: Daniel Wagner, Winterbach (DE); Markus Herrmann, Fellbach (DE); Alexander Nordmann, Stuttgart (DE); Joachim Kolb, Ludwigsburg (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 101 days.

(21) Appl. No.: 16/571,994

(22) Filed: Sep. 16, 2019

(65) Prior Publication Data

US 2020/0091476 A1    Mar. 19, 2020

(30) Foreign Application Priority Data

Sep. 17, 2018  (EP) ..................... 18194901

(51) Int. Cl.
*H01M 50/209* (2021.01)
*B25F 5/02* (2006.01)

(52) U.S. Cl.
CPC ............. *H01M 50/209* (2021.01); *B25F 5/02* (2013.01); *H01M 2220/30* (2013.01)

(58) Field of Classification Search
CPC .. B25F 5/00; B25F 5/02; B23Q 17/00; H01M 10/42; H01M 50/209
See application file for complete search history.

(56) References Cited

U.S. PATENT DOCUMENTS

| | | |
|---|---|---|
| 9,893,329 B2 | 2/2018 | Sakakibara |
| 2012/0045667 A1 | 2/2012 | Yoneda et al. |
| 2013/0164600 A1* | 6/2013 | Rosskamp ........ H01M 10/0481 429/159 |
| 2013/0224539 A1 | 8/2013 | Hayashi et al. |

(Continued)

FOREIGN PATENT DOCUMENTS

| | | |
|---|---|---|
| DE | 10 2015 008 608 A1 | 1/2016 |
| EP | 2 421 067 A1 | 2/2012 |
| EP | 2 819 207 A1 | 12/2014 |

OTHER PUBLICATIONS

European Search Report issued in counterpart European Application No. 18194901.7 dated Apr. 3, 2019 with partial English translation (10 pages).

*Primary Examiner* — Nathaniel C Chukwurah
(74) *Attorney, Agent, or Firm* — Crowell & Moring LLP

(57) ABSTRACT

A rechargeable battery pack includes an external housing with a housing base and a housing hood, connected to the housing base and surrounding an interior space, and a rechargeable battery cell block arranged in the interior space. The battery pack has a water discharge structure for discharging water contained in the interior space and/or water entering the external housing from the outside. The water discharge structure has, on one side of the external housing, a double-labyrinth wall structure which is open to liquid. An outer labyrinth wall structure is formed by overlapping respectively of an outer side wall of the housing base and housing hood. An inner labyrinth wall structure, which is arranged offset in relation to the outer labyrinth wall structure in the direction of the interior space, is formed by overlapping respectively of an inner side wall of the housing base and housing hood.

17 Claims, 6 Drawing Sheets

(56) References Cited

U.S. PATENT DOCUMENTS

2015/0188332 A1* 7/2015 Nakano ................ H02J 7/0042
　　　　　　　　　　　　　　　　　　　　　　　320/112
2016/0006005 A1* 1/2016 Sakakibara ........... H01M 10/65
　　　　　　　　　　　　　　　　　　　　　　　429/7

* cited by examiner

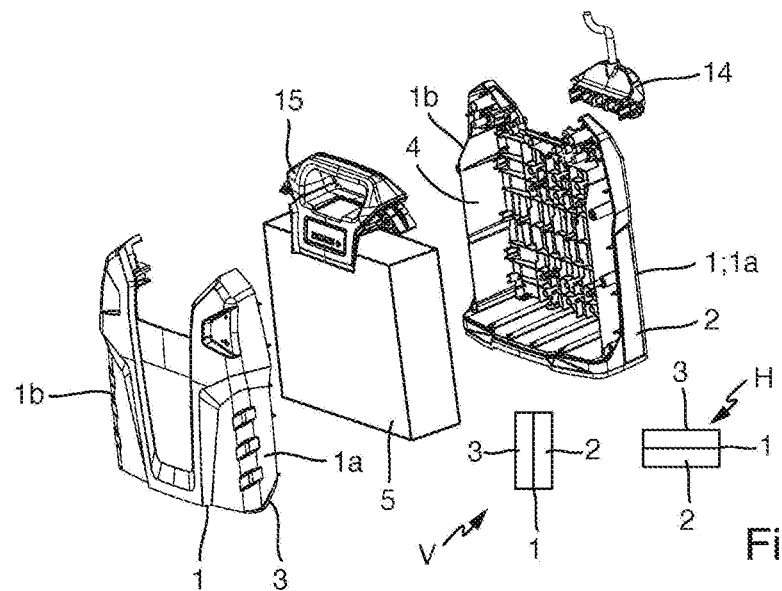
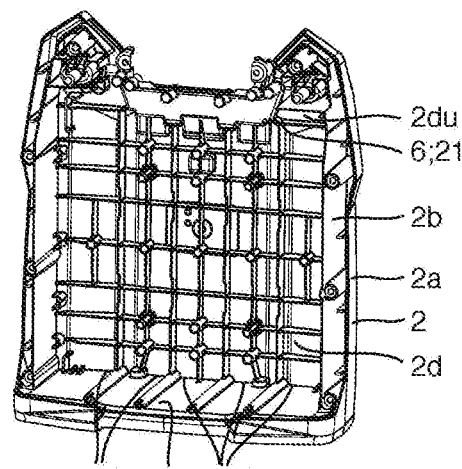
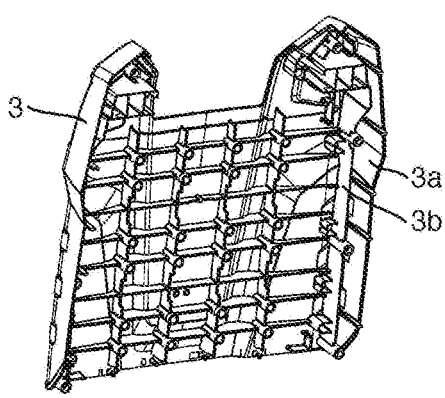
Fig. 1
Fig. 2
Fig. 3

RECHARGEABLE BATTERY PACK

BACKGROUND AND SUMMARY OF THE INVENTION

The invention relates to a rechargeable battery pack for supplying electrical energy to hand-held power tools, in particular electrically powered gardening and forestry tools, wherein the rechargeable battery pack is designed for selective use in a vertical use position, in particular worn on the back, and a horizontal use position, in particular docked to a tool. The said rechargeable battery pack comprises an external housing which contains a housing base and a housing hood, which is connected to the said housing base, and surrounds an interior space, and comprises a rechargeable battery cell block which is arranged in the interior space. The invention also relates to a tool set comprising a rechargeable battery pack of this kind.

In the present case, hand-held power tools are to be understood to mean, in particular, power tools which are carried by hand or guided along the ground, in particular those used for gardening and/or forestry work, such as power saws, hedge shears, leaf blowers, sweepers, lawnmowers and scarifiers, to name just a few examples. Depending on the system design, the rechargeable battery pack is designed to be mechanically held directly on the power tool or worn on the user's back by means of an appropriate harness system. In corresponding designs and applications, the rechargeable battery pack is electrically and mechanically coupled directly to the power tool, without being worn by the user, or the rechargeable battery pack and the power tool are worn by the user by means of the harness system or the user wears only the rechargeable battery pack on his back and the power tool is mechanically decoupled from the said rechargeable battery pack and electrically connected to the rechargeable battery pack, preferably by wires. The rechargeable battery pack provides the electrical energy which the power tool requires during use, for which purpose the said rechargeable battery pack has suitable rechargeable battery cells, which are to be understood here to mean any desired conventional accumulator or battery cells, in the rechargeable battery cell block.

The rechargeable battery pack under consideration in the present case is suitable for several of these different uses since it can be selectively used in a vertical use position and a horizontal use position. In the present case, the positional characterization as vertical means an upright use position of the rechargeable battery pack which is intended to be understood to mean not only an exactly vertical position, that is to say a substantially vertical profile of a corresponding longitudinal plane of the rechargeable battery pack, but also use positions which are inclined in relation to the said exactly vertical position and in which the rechargeable battery pack, by way of its longitudinal plane, forms an acute angle of up to 45° in relation to the vertical. Similarly, in the present case, the horizontal use position comprises all use positions in which a corresponding transverse plane of the rechargeable battery pack runs horizontally or forms an acute angle of at most 45° with the horizontal. The rechargeable battery pack is usually in a vertical use position, and rarely in the horizontal use position, when it is worn on the user's back. Conversely, the rechargeable battery pack is usually in the horizontal use position, and rarely in the vertical use position, when it is docked directly to the power tool and not worn by the user. For example, a rechargeable battery pack of the kind mentioned at the outset and disclosed in the laid-open publication EP 2 819 207 A1 is designed to be able to be selectively used in a vertical use position worn on a user's back and a horizontal use position docked to a tool.

As is known, damage to or functional breakdown of the rechargeable battery pack and, in particular, its electrical components can occur when water or moisture enters the interior space of the rechargeable battery pack or water forms locally in the interior space due to condensation. It is therefore necessary to protect, in particular, the water- or moisture-sensitive components of the rechargeable battery pack, such as the rechargeable battery cell block and associated peripheral electrical components, against water/moisture influences of this kind.

U.S. Pat. No. 9,893,329 B2 discloses a rechargeable battery pack which is worn on a user's back in the vertical use position, in which rechargeable battery pack the rechargeable battery cell block is enclosed by a water-tight internal housing in the interior space of the external housing. This is intended to prevent water from entering the rechargeable battery cell block. In this rechargeable battery pack, the housing hood and the housing base form two housing shell halves which bear against one another along a centre plane over the entire periphery. In order to be able to discharge water which may be contained in the interior space between the water-tight internal housing and the external housing to the outside, water outflow openings in paired association offset in relation to one another and a water discharge duct, which connects the respective pair of water outlet openings and has a Z-shaped profile, are formed in the housing base and in the housing hood in a bottom side section thereof in each case.

Laid-open publication US 2012/0045667 A1 states that it is difficult to realize a completely water-tight structure in a rechargeable battery pack and instead proposes, for a rechargeable battery pack which is preferably to be coupled to a rechargeable battery tool in a horizontal use position, providing the housing bottom side with simple water outlet openings.

Laid-open publication US 2013/0224539 A1 discloses, for a similar rechargeable battery pack, a more complex water discharge structure with water outlet openings on the housing bottom side, wherein the water discharge structure is arranged, in particular, between two electrical connection elements for in each case one electrode of the rechargeable battery cells of the rechargeable battery cell block and, in addition, can contain a special profile design of the water outlet openings and water-conducting wall structures which lead to the water outlet openings.

It is an object of the invention to provide a rechargeable battery pack of the kind mentioned at the outset with protection against moisture/water influences which is advantageous over the abovementioned prior art, and providing a tool set comprising a rechargeable battery pack of this kind.

The invention achieves this and other objects by providing a specific rechargeable battery pack according to the invention and a specific tool set according to the invention.

The rechargeable battery pack according to the invention comprises an external housing including a housing base and a housing hood, which is connected to said housing base and surrounds an interior space, and further comprises a rechargeable battery cell block which is arranged in the interior space, and a water discharge structure for discharging water which is contained in the interior space and/or water which enters the housing from the outside. In this way, the rechargeable battery pack is advantageously protected against moisture/water influences, in particular by way of the water discharge structure preventing an undesired quantity of water or moisture from being able to enter the interior space in which the rechargeable battery cell block is contained or remain in the said interior space, with a relatively low level of expenditure. In particular, this also protects the rechargeable battery cell block against corresponding risks of damage/breakdown due to water which has ingressed or moisture which has ingressed. The water discharge structure is specifically designed for this purpose.

According to one aspect of the invention, the water discharge structure contains, on at least one side of the external housing, a double-labyrinth wall structure which is open to liquid and has an outer labyrinth wall structure, which is formed by overlapping respectively of an outer side wall of the housing base and of the housing hood, and an inner labyrinth wall structure, which is arranged offset in relation to the outer labyrinth wall structure in the direction of the interior space and offset transversely thereto and which is formed by overlapping respectively of an inner side wall of the housing base and of the housing hood. The labyrinth profile of these two wall structures and their transversely offset arrangement provides a high degree of protection against water striking the rechargeable battery pack from the outside directly against the housing side in question. At the same time, the design of these wall structures so as to be open to liquid allows drainage or discharge of any water which has ingressed into the interior space or has formed due to condensed moisture and any moisture in the interior space to the outside into the surrounding area outside the rechargeable battery pack. The housing side which is provided with this double-labyrinth wall structure may be any side of the external housing of the rechargeable battery pack, for example a housing side which is the longitudinal side in a vertical use position. Furthermore, it goes without saying that from several up to all sides of the rechargeable battery pack external housing can have a double-labyrinth wall structure of this kind which is open to liquid, depending on requirements.

According to a further aspect of the invention, the water discharge structure contains a discharge wall structure which comprises a housing wall structure of a component which is arranged in the interior space, wherein the housing wall structure contains, in the vertical or in the horizontal use position of the rechargeable battery pack, top-side housing wall parts which run in a direction downwards and to the outside from a separating line. This increases, in particular for this component, the protection against ingressing water or ingressing moisture on that side of the component which forms the top side of the component in the vertical or the horizontal use position of the rechargeable battery pack. There, water which strikes the component from the outside is discharged downwards and to the outside through the said housing wall parts, so that the component is protected against ingressing water along the separating line of the housing wall parts. The component may be, in particular, a moisture- or water-sensitive enclosed component, such as an electrical component of the rechargeable battery pack.

According to a further aspect of the invention, the water discharge structure contains a labyrinth wall structure which is open to liquid and, in the vertical or the horizontal use position of the rechargeable battery pack, is formed, in a manner leading in a direction downwards and to the outside, between an electrical plug-in connection body, which is arranged on the side of the housing base, and a corresponding tool connection plug in the plugged-in position. This measure provides, in particular, protection of the electrical connection, which is made between the rechargeable battery pack and a power tool which is supplied with electrical power by the said rechargeable battery pack, when the tool connection plug of the power tool is inserted into the plug-in connection body which is located on the rechargeable battery pack on the side of the housing base of the rechargeable battery pack external housing. In the present vertical or horizontal use position of the rechargeable battery pack, water or moisture which may ingress into this plug-in connection region can be discharged or drained via the labyrinth wall structure which is open to liquid, so that the electrical connection is not adversely affected by water remaining there or moisture remaining there.

In a development of the invention, the inner labyrinth wall structure is additionally arranged offset in relation to the outer labyrinth wall structure in a transverse direction which is perpendicular in relation to the offset direction which faces the interior space. This contributes to further increasing the protection against moisture by the double-labyrinth wall structure.

In a development of the invention, the rechargeable battery pack has, on its side which is at the top in the vertical use position, a grip part which is connected to the housing base and/or the housing hood by means of a groove connection which is designed as a water ingress block. The grip part is advantageous for handling the rechargeable battery pack and the design of the grip part as a dedicated component separately from the housing base and/or the housing hood is structurally expedient and allows the grip part to be removed from the housing base or the housing hood, if required, owing to a detachable design of the groove connection. The design of the groove connection as a water ingress block prevents an undesired ingress of water or moisture at this point from outside the rechargeable battery pack into the interior space of the said rechargeable battery pack.

In a development of the invention, the rechargeable battery pack contains an operator control panel circuit board body and a contact plate body, and the water discharge structure has a labyrinth wall structure which is open to liquid and is formed between the operator control panel circuit board body and the contact plate body. This constitutes, in particular, protection of these electrical components, which are typically contained in the interior space of the rechargeable battery pack, against the ingress of water at this point into the region between these two electrical components. At the same time, the design of this labyrinth wall structure so as to be open to liquid allows water which may be present there to be discharged or drained from this region.

In a development of the invention, the housing base contains a bottom wall which is at the bottom in the vertical use position of the rechargeable battery pack, and the water discharge structure has one or more water outlet openings, which lead to the outside from the interior space, in this bottom wall. Owing to this measure, any water which may have ingressed into the interior space of the rechargeable battery pack in the vertical use position of the rechargeable battery pack can be very easily discharged to the outside via the water outlet openings in the bottom wall.

In a development of the invention, the housing base contains a rear wall which is on the rear side in the vertical use position of the rechargeable battery pack and at the bottom in the horizontal use position of the rechargeable battery pack, wherein the rear wall runs in a manner inclined downwards in the horizontal use position. The water discharge structure has one or more water outlet openings, which lead to the outside from the interior space, in this rear wall at its end region which is inclined downwards in the horizontal use position. This expediently allows drainage of water which may have ingressed into the interior space or formed there to the outside when the rechargeable battery pack is in the horizontal use position, and prevents a large amount of water from being able to remain in the interior space in an undesired manner in this use position of the rechargeable battery pack.

In a development of the invention, the rechargeable battery pack contains an electrical plug-in connection body with a contact socket body, and the water discharge structure has one or more water discharge openings in the contact socket body. This allows water which may have entered the region of the contact socket body to be discharged and accordingly protects the electrical contact which is intended to be made with the plug-in connection body, for example by insertion of a connection plug of a power tool which is to be connected.

In a development of the invention, the rechargeable battery pack contains a liquid-tight electrical line bushing which is routed through the external housing and which has a bushing opening with a stepped cross section in the external housing and a bushing stopper with a Christmas tree profile. The insertion of the bushing stopper with its Christmas tree profile into the bushing opening with its stepped cross section produces the desired electrical line bushing of liquid-tight design. This prevents the ingress of water or moisture at this point from the exterior space into the interior space through the external housing of the rechargeable battery pack.

In a development of the invention, in at least one of the two labyrinth wall structures of the double-labyrinth wall structure, an overlap length of the two side walls involved is greater than an overlap width which is perpendicular thereto and/or side walls involved overlap one another with a constant wall thickness. This contributes to protecting against moisture in a structurally advantageous manner.

The tool set according to the invention comprises the rechargeable battery pack according to the invention and a hand-held power tool and/or a harness device. The power tool can be at least electrically and optionally additionally mechanically coupled to the rechargeable battery pack by means of an associated coupling unit. The power tool may be, in particular, an electrically powered gardening or forestry tool. Similarly, an associated coupling unit serves to at least mechanically couple the rechargeable battery pack and the harness device, which coupling unit is optionally additionally designed for electrically coupling the rechargeable battery pack and the harness device. In the latter case, the power tool can be electrically coupled to the harness device. Depending on requirements and the application, the tool set comprises, in addition to the rechargeable battery pack, only the power tool with the associated coupling unit or only the harness device with the associated coupling unit or both the power tool with the associated coupling unit and the harness device with the associated coupling unit.

Advantageous exemplary embodiments of the invention are illustrated in the drawings. These and further advantageous embodiments of the invention will be described in more detail below.

BRIEF DESCRIPTION OF THE DRAWINGS

In the drawings:

FIG. 1 shows a schematic perspective view of a rechargeable battery pack with schematically reproduced use positions.

FIG. 2 shows a perspective plan view of the inside of a housing base of the rechargeable battery pack.

FIG. 3 shows a perspective plan view of the inside of a housing hood of the rechargeable battery pack.

DETAILED DESCRIPTION OF THE DRAWINGS

Figure 4:
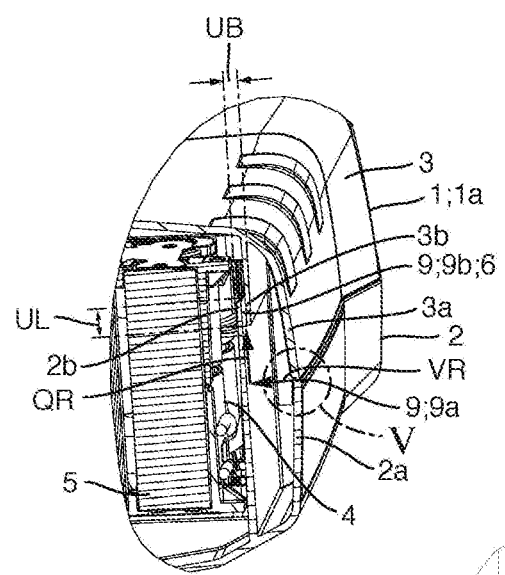
FIG. 4 shows a detail of a perspective cross-sectional view of the rechargeable battery pack.

The rechargeable battery pack shown in various illustrations in FIGS. 1 to 18 serves to supply electrical energy to hand-held power tools, in particular electrically powered gardening and/or forestry tools, and is designed for selective use in a vertical use position V or a horizontal use position H, as indicated in the associated schematic partial images of FIG. 1. The rechargeable battery pack contains an external housing 1 which has a housing base 2 and a housing hood 3, which is connected to the said external housing, and surrounds an interior space 4. A rechargeable battery cell block 5, only schematically shown, is arranged in the interior space. The rechargeable battery cell block 5 has any of the known conventional designs, this being of no further interest here and therefore requiring no further explanations. The rechargeable battery pack also has a water discharge structure 6 for discharging water which is contained in the interior space 4 and/or water which enters the external housing 1 from the outside.

In the example shown, the rechargeable battery pack has a roughly cuboidal configuration, wherein it assumes an upright position in the vertical use position V, that is to say the top side and the bottom side of the rechargeable battery pack are formed by two cuboidal narrow sides in this position, whereas it assumes a recumbent position in the horizontal use position H, that is to say the two cuboidal main sides then form the top side and, respectively, the bottom side. Unless stated otherwise in the text which follows, reference is made to the upright, vertical use position V with regard to the positional directions. The vertical use position V is typically that position which the rechargeable battery pack is in when it is worn on the user's back, in particular by means of an associated harness system. When the rechargeable battery pack is docked to a power tool which is to be fed with electrical power by the said rechargeable battery pack, it is usually in the horizontal use position H on the power tool, in some cases alternatively in the vertical use position V or with a yet further positional orientation. Similarly, in some cases, the rechargeable battery pack can alternatively be in the horizontal use position H or have any other positional orientation which is different from the vertical use position V when it is worn on the user's back.

Figure 5:
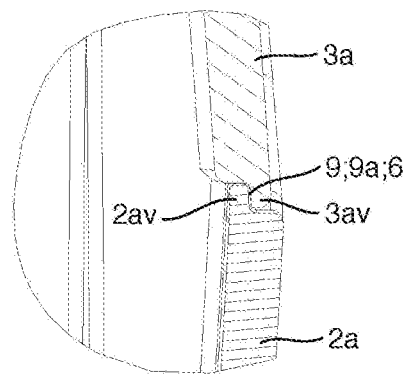
FIG. 5 shows a view of a detail of a region V from FIG. 4.

In corresponding embodiments, the water discharge structure 6 contains, as shown, a double-labyrinth wall structure 9, which is open to liquid, on at least one side of the external housing 1, for example on a first vertical longitudinal side 1a which is lateral in the vertical use position V, as shown in FIGS. 4 and 5, and/or on an opposite second vertical longitudinal side 1b which is lateral in the vertical use position V. The double-labyrinth wall structure 9 comprises an outer labyrinth wall structure 9a and an inner labyrinth wall structure 9b, wherein the inner labyrinth wall structure 9b is arranged offset in relation to the outer labyrinth wall structure 9a in a direction VR facing the interior space. The outer labyrinth wall structure 9a is formed by overlapping of an outer side wall 2a of the housing base 2 with an outer side wall 3a of the housing hood 3. The inner labyrinth wall structure 9b is formed by overlapping of an inner side wall 2b of the housing base 2 with an inner side wall 3b of the housing hood 3.

This double-labyrinth wall structure 9 which is open to liquid firstly allows the ingress of water into the rechargeable battery pack from the outside to be kept modest and secondly allows water which has ingressed or moisture which is present in the interior space 4 of the rechargeable battery pack or water which is formed by condensation to flow away downwards and, respectively, to the outside, so that the rechargeable battery cell block 5 in the interior space 4 is protected against damage due to moisture.

In corresponding embodiments, as in the exemplary embodiment shown, the inner labyrinth wall structure 9b is additionally arranged offset in relation to the outer labyrinth wall structure 9a in a transverse direction QR, wherein the transverse direction QR is perpendicular in relation to the direction VR which faces the interior space. In addition, this transverse direction QR is preferably perpendicular in relation to a direction in which the double-labyrinth wall structure 9 runs, that is to say perpendicular in relation to the profile of a separating line between the housing base 2 and the housing hood 3 in this region. This measure can noticeably increase the efficiency of the protection against moisture of the double-labyrinth wall structure 9. In alternative embodiments, the two labyrinth wall structures 9a, 9b are situated opposite one another without a transverse offset of this kind.

At least one of the two labyrinth wall structures 9a, 9b preferably has, in its cross-sectional plane, a Z-shaped profile, this applying to both labyrinth wall structures 9a, 9b in the example shown. Here, it may be advantageous when, as shown and can be seen in FIG. 4, an overlap length UL of the two side walls 2b, 3b involved is relatively large, in particular larger than an overlap width UB which is measured perpendicularly in relation to the side walls 2b, 3b, in the case of the inner labyrinth wall structure 9b. As an alternative or in addition, it may be advantageous when, as shown for the inner labyrinth wall structure 9b, the side walls 2b, 3b involved overlap one another with a constant wall thickness, that is to say they each have the same wall thickness in the overlap region as in the region adjoining the overlap region and, for this purpose, are arranged offset in relation to one another in the direction facing the interior space 4. For the outer labyrinth wall structure 9a, it may be advantageous when the overlap, as shown and clear from FIG. 5, is realized by way of the two side walls 2b, 3b involved overlapping one another only in the region of two corresponding projections 2av, 3av which are formed by reducing the respective wall thickness. In this way, the side walls 2a, 3a involved can be situated opposite one another on the outer labyrinth wall structure 9a, substantially on the outside, in alignment, this possibly being desirable for the corresponding configuration of the external housing 2.

Figure 6:
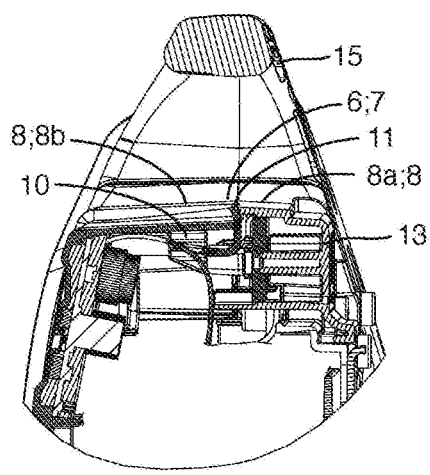
FIG. 6 shows a detail of a longitudinal sectional view of a region of the rechargeable battery pack which is at the top in the vertical use position.
Figure 7:
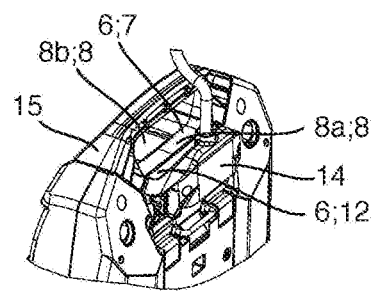
FIG. 7 shows a perspective view of the region of the rechargeable battery pack which is at the top in the vertical use position.

In corresponding embodiments, the water discharge structure 6 has, in addition or as an alternative to the double-labyrinth wall structure 9, a discharge wall structure 7 which comprises a housing wall structure 8 of a component 10 which is arranged in the interior space 4, as can be seen in FIGS. 6 and 7. This housing wall structure 8 contains housing wall parts 8a, 8b which, in the vertical use position V or in the horizontal use position H of the rechargeable battery pack, form top-side housing wall parts which run in a direction downwards and to the outside, that is to say in a direction away from the interior space 4, from a separating line 11. In FIGS. 6 and 7, this is illustrated particularly for the top-side housing wall parts 8a, 8b of the component 10 in the vertical use position V of the rechargeable battery pack.

In the example shown, the component 10 which is protected against moisture influences or the ingress of water by this discharge wall structure 7 is an electrical component which comprises, for example, an operator control panel unit and/or an electrical contact plate unit. As an alternative, said component may be another, preferably electrical, component which is intended to be protected against ingressing water.

Figure 8:
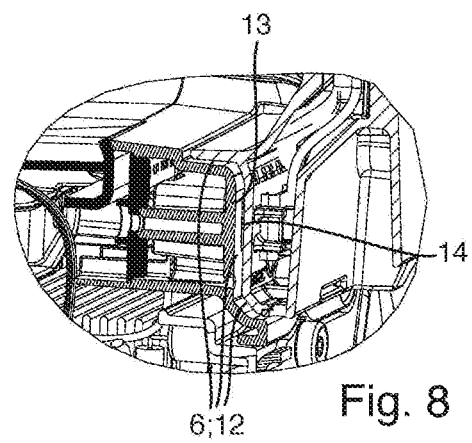
FIG. 8 shows a detail of a perspective longitudinal sectional view of an electrical plug-in connection region of the rechargeable battery pack.

In corresponding embodiments, the water discharge structure 6 contains, in addition or as an alternative to the double-labyrinth wall structure 9 and/or to the discharge wall structure 7, a labyrinth wall structure 12 which is open to liquid and, in the vertical use position V or the horizontal use position H of the rechargeable battery pack, is formed, in a manner leading in a direction downwards and to the outside, between an electrical plug-in connection body 13, which is arranged on the side of the housing base 2, and a corresponding tool connection plug 14 in the plugged-in position, that is to say when the tool connection plug 14 is inserted into the plug-in connection body 13. As can be seen in FIG. 8 in particular, this labyrinth wall structure 12 has, in the example shown, a profile which is Z-shaped in its cross-sectional plane. By way of this measure, the electrical contact region of the plug-in connection body 13 and the tool connection plug 14 is, in particular, protected against water ingressing or remaining so as to cause damage.

Figure 9:
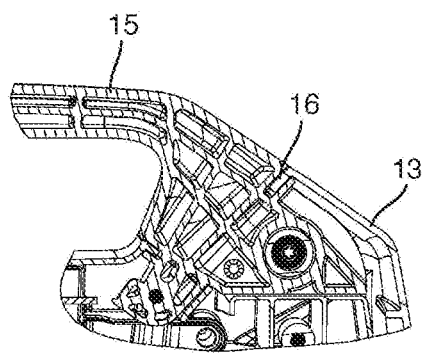
FIG. 9 shows a detail of a longitudinal sectional view of a lateral region of the rechargeable battery pack which is at the top in the vertical use position.
Figure 10:
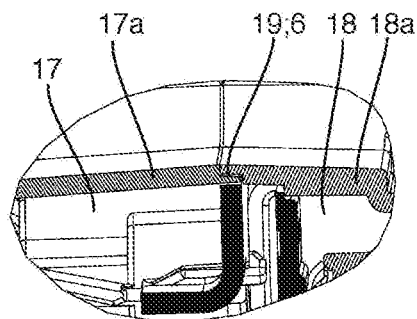
FIG. 10 shows a detail of a cross-sectional view of the rechargeable battery pack in the region of an electrical component assembly.
Figure 11:
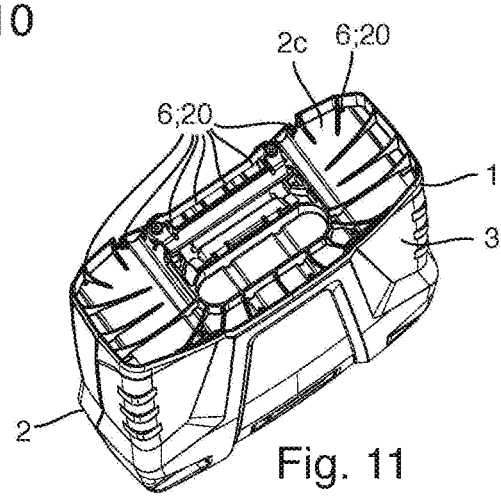
FIG. 11 shows a perspective plan view of a side of the rechargeable battery pack which is at the bottom in the vertical use position.
Figure 12:
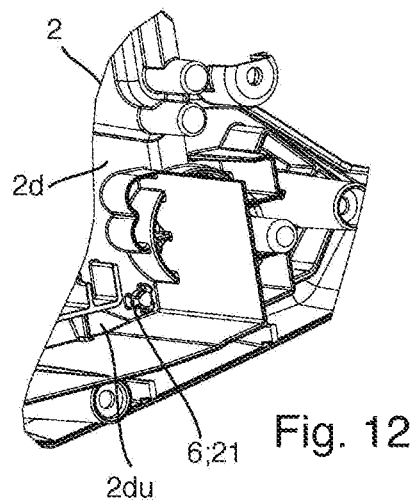
FIG. 12 shows a detail of a perspective plan view of the housing base in a side region which is at the bottom in the horizontal use position.
Figure 13:
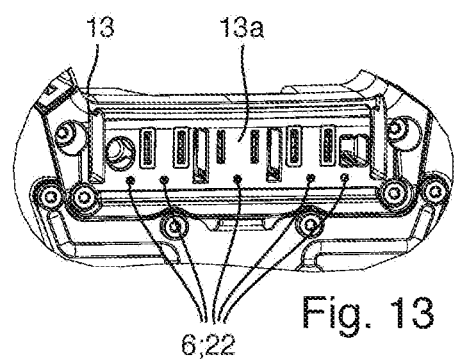
FIG. 13 shows a detail of a perspective view of an electrical plug-in connection assembly of the rechargeable battery pack.

In corresponding embodiments, the rechargeable battery pack, as in the example shown, has, on its side which is at the top in the vertical use position V, a grip part 15 which is connected to the housing base 2 and/or the housing hood 3 by means of a groove connection 16, as can be seen in FIG. 9 in particular. The groove connection 16 is designed so as to block the ingress of water, that is to say in such a way that it blocks ingressing water. This prevents water ingress at this joint between the grip part 15 on the one hand and the housing base 2 and/or the housing hood 3 on the other hand.

In corresponding embodiments, the rechargeable battery pack, as in the exemplary embodiment shown, contains an operator control panel circuit board body 17 with a wall 17a and contains a contact plate body 18 with a wall 18a, a labyrinth wall structure 19 which is open to liquid being formed between the said operator control panel circuit board body and contact plate body as a further constituent part of the water discharge structure 6. This labyrinth wall structure 19 which is open to liquid can be seen, in particular, in FIG. 10 and constitutes a special moisture protection means for these electrical components which are typically contained in the interior space 4 of the rechargeable battery pack. If required, the labyrinth wall structure 19 can be configured, as shown, similarly to the outer labyrinth wall structure 9a of the exemplary embodiment shown such that the walls 17a, 18a, which are involved with the labyrinth wall structure 19, of the components protected thereby are substantially in alignment on the outside. The labyrinth wall structure 19 shown can be located, for example, on a vertical longitudinal side of the operator control panel circuit board body 17 and of the contact plate body 18 when the rechargeable battery pack is oriented in its vertical use position V.

In corresponding embodiments, the housing base 2, as in the exemplary embodiment shown, has a bottom wall 2c which is at the bottom in the vertical use position V of the rechargeable battery pack, and the water discharge structure 6 contains one or more water outflow openings 20, which lead to the outside from the interior space 4, in this lower bottom wall 2c. These water outlet openings 20 can be identified, for example, in the views of FIGS. 2 and 11. The said water outlet openings are preferably located along one or more side edge regions of the bottom wall 2c. Water can be drained from the interior space 4 of the rechargeable battery pack to the outside, that is to say out of the external housing 1 of the rechargeable battery pack, via the water outlet openings 20. This prevents water from remaining in the rechargeable battery pack over a relatively long period of time or collecting in the interior space 4 of the rechargeable battery pack.

In corresponding embodiments, the housing base 2 has a rear wall 2d which is on the rear side in the vertical use position V of the rechargeable battery pack and at the bottom in the horizontal use position H of the rechargeable battery pack and which runs in a manner inclined downwards in the horizontal use position H of the rechargeable battery pack. The rear wall 2d contains, as a further component of the water discharge structure 6, one or more water outlet openings 21, which lead to the outside from the interior space 4, at its end region 2du which is inclined downwards in the horizontal use position H of the rechargeable battery pack. As a result, water which has entered the interior space 4 or has formed there can be drained out of the rechargeable battery pack to the outside through the water outlet openings 21 in the rear wall 2d of the housing base 2 when the rechargeable battery pack is in its horizontal use position H. This prevents an undesired collection of water in the interior space 4 when the rechargeable battery pack is used in the horizontal use position H. The water outlet openings 21 can be identified, for example, in the illustrations of FIGS. 2 and 12.

In corresponding embodiments, the rechargeable battery pack, as shown, has the abovementioned electrical plug-in connection body 13 with a contact socket body 13a which may be, for example, the abovementioned contact plate body 18. In the embodiment shown, the contact socket body 13a has, as a further component of the water discharge structure 6, one or more water discharge openings 22. The water discharge openings 22 in the contact socket body 13a can be seen, for example, in the illustration from FIG. 13 and allow any water which has entered the region of the contact socket body 13a to be routed out of the contact socket body 13a or away from the said contact socket body.

Figure 14:
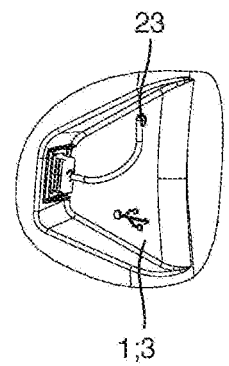
FIG. 14 shows a detail of a perspective view of the housing hood in the region of a line bushing.
Figure 15:
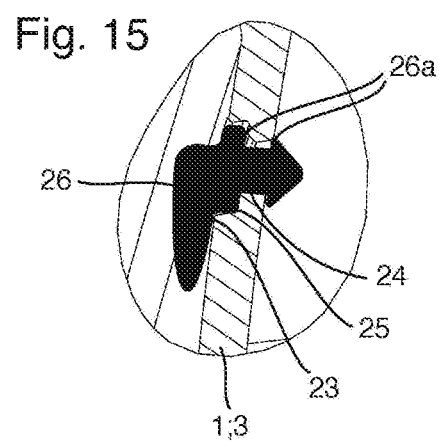
FIG. 15 shows a sectional view of a detail of the region of the line bushing from FIG. 14.

In corresponding embodiments, the rechargeable battery pack has a liquid-tight electrical line bushing 23, shown in FIGS. 14 and 15, which is routed through the external housing 1 and which comprises a bushing opening 24 with a stepped cross section 25 in the external housing 1 and a bushing stopper 26 with a Christmas tree profile 26a. This configuration of the line bushing 23 can be identified, for example, from FIG. 15. The Christmas tree profile 26a of the bushing stopper 26 is matched to the stepped cross section 25 of the bushing opening 24 in the external housing 1 in such a way that the bushing opening 24 is closed in the desired liquid-tight manner by means of the bushing stopper 26.

Depending on requirements and the application, further moisture protection measures can be provided for the rechargeable battery pack, in particular wherein the moisture protection measures can be independent of whether the tool connection plug 14 is inserted into the plug-in connection body 13 or not. This includes, for example, the measure of providing a step-like wall profile for particular wall regions of the housing base 2 and/or of the housing hood 3 in such a way that water which has ingressed can be captured by means of this step-type wall structure and conducted in a direction to the outside. In general, it is expedient for this purpose for step-type wall structures of this kind and other wall structures in the interior of the rechargeable battery pack to run downwards with a gradient from component separation arrangements and to the outside in the direction away from the interior space 4, depending on requirements in line with the use position which the rechargeable battery pack is in, and/or in particular independently of whether the tool connection plug 14 is inserted into the plug-in connection body 13 or not.

Figure 16:
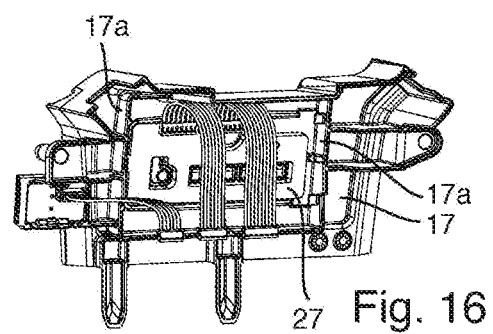
FIG. 16 shows a perspective view of an electrical component assembly of the rechargeable battery pack from the rear.

FIG. 16 illustrates, as a further optional moisture protection measure, fitting an internal seal 27 to the operator control panel circuit board body 17.

Figure 17:
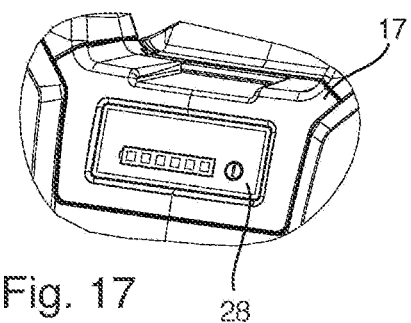
FIG. 17 shows a detail of a perspective view of an electrical operator control panel assembly of the rechargeable battery pack.

FIG. 17 illustrates, as a further optional moisture protection measure, fitting a sealed-off adhesive label 28 to a front side of the operator control panel circuit board body 17.

Figure 18:
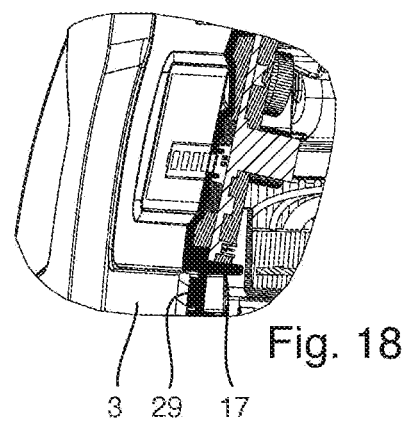
FIG. 18 shows a detail of a longitudinal sectional view of the operator control panel assembly from FIG. 17.

FIG. 18 illustrates, as a further moisture protection measure, fitting a foam rubber seal 29 between the operator control panel circuit board body 17 and the housing hood 3. As an alternative or in addition, one or more seals of this kind or of another kind can be provided particularly at exposed regions which are at risk of moisture ingressing.

Figure 19:
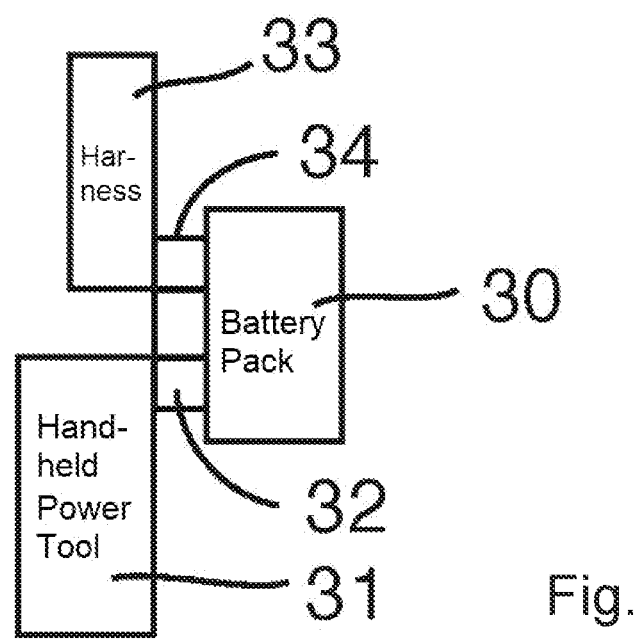
FIG. 19 shows a schematic block diagram illustration of a tool set comprising a rechargeable battery pack.

FIG. 19 illustrates, in a block diagram, a tool set comprising a rechargeable battery pack 30 in an embodiment according to the invention. Furthermore, the tool set comprises a hand-held power tool 31 and/or a harness device 33, depending on requirements and the application.

The power tool 31 may be, in particular, an electrically powered gardening or forestry tool which is fed with electrical power by the rechargeable battery pack 30. A coupling unit 32 serves to electrically couple the rechargeable battery pack 30 and the power tool 31. In addition, the coupling unit 32 can optionally serve to mechanically couple the rechargeable battery pack 30 and the power tool 31.

The rechargeable battery pack 30 can be worn on a user's back by way of the harness device 33. A coupling unit 34 serves to mechanically couple the rechargeable battery pack 30 and the harness device 33. The coupling unit 34 can optionally also provide for electrical coupling of the harness device 33 to the rechargeable battery pack 30. In embodiments in which the tool set has both the power tool 31 and the harness device 33, the rechargeable battery pack 30 is advantageously designed to be able to be selectively mechanically coupled to the power tool 31 or to the harness device 33. Owing to a corresponding design of the coupling units 32, 34 or of a common coupling unit which comprises the said coupling units, it is possible, depending on requirements, to electrically couple the power tool to the rechargeable battery pack 30 directly or via the harness device and/or to selectively mechanically couple the power tool 31 to the rechargeable battery pack 30 directly or via the harness device 33. The latter case may be of interest particularly for hand-held power tools which can be worn on the back.

The harness device can be one of the conventional type or a harness device as is disclosed in the related European patent application no. 18194891.0 by the same applicant and a corresponding parallel US patent application (our file reference P 57571 US) the content of which is hereby fully incorporated in the disclosure of the present application by reference.

As is clear from the exemplary embodiments shown and explained above, the invention provides a rechargeable battery pack which is protected in a highly advantageous manner against damage due to moisture, in particular against damage or breakdown of the rechargeable battery cell block which is accommodated in the interior space of the rechargeable battery pack. The rechargeable battery pack can advantageously be used in conjunction with a harness system and/or with hand-held power tools.

What is claimed is:

1. A rechargeable battery pack for supplying electrical energy to hand-held power tools, wherein the rechargeable battery pack is designed for selective use in a vertical use position or a horizontal use position, comprising:
   an external housing which comprises a housing base and a housing hood, which is connected to said housing base and surrounds an interior space;
   a rechargeable battery cell block which is arranged in the interior space; and
   a water discharge structure for discharging at least one of water contained in the interior space and water which enters the external housing from the outside, wherein the water discharge structure comprises at least one of:
   (i) on at least one side of the external housing, a double-labyrinth wall structure which is open to liquid and has an outer labyrinth wall structure, which is formed by overlapping of an outer side wall of the housing base and an outer side wall of the housing hood, and an inner labyrinth wall structure, which is arranged offset in relation to the outer labyrinth wall structure in a direction facing the interior space and which is formed by overlapping of an inner side wall of the housing base and an inner side wall of the housing hood,
   (ii) a discharge wall structure which comprises a housing wall structure of a component which is arranged in the interior space, wherein the housing wall structure contains, in the vertical or in the horizontal use position of the rechargeable battery pack, top-side housing wall parts which run in a direction downwards and to the outside from a separating line of the top-side housing wall parts, and
   (iii) a labyrinth wall structure which is open to liquid and, in the vertical or the horizontal use position of the rechargeable battery pack, is formed, in a manner leading in a direction downwards and to the outside, between an electrical plug-in connection body, which is arranged on the side of the housing base, and a corresponding tool connection plug in a plugged-in position.

2. The rechargeable battery pack according to claim 1, wherein the inner labyrinth wall structure is additionally arranged offset in relation to the outer labyrinth wall structure in a transverse direction which is perpendicular in relation to the direction which faces the interior space.

3. The rechargeable battery pack according to claim 1, further comprising:
   on its side which is at the top in the vertical use position, a grip part which is connected to at least one of the housing base and the housing hood by a groove connection which blocks the ingress of water.

4. The rechargeable battery pack according to claim 1, further comprising:
   an operator control panel circuit board body and a contact plate body, wherein the water discharge structure comprises a labyrinth wall structure which is open to liquid and is formed between the operator control panel circuit board body and the contact plate body.

5. The rechargeable battery pack according to claim 1, wherein the housing base comprises a bottom wall which is at the bottom in the vertical use position of the rechargeable battery pack, and the water discharge structure comprises one or more water outlet openings, which lead to the outside from the interior space, in the bottom wall.

6. The rechargeable battery pack according to claim 1, wherein the housing base comprises a rear wall which is on the rear side in the vertical use position and at the bottom in the horizontal use position and which runs in a manner inclined downwards in the horizontal use position, and the water discharge structure comprises one or more water outlet openings, which lead to the outside from the interior space, in the rear wall at its end region which is inclined downwards in the horizontal use position.

7. The rechargeable battery pack according to claim 1, further comprising:
   an electrical plug-in connection body with a contact socket body, and the water discharge structure comprises one or more water discharge openings in the contact socket body.

8. The rechargeable battery pack according to claim 1, further comprising:
   a liquid-tight electrical line bushing which is routed through the external housing and which has a bushing opening with a stepped cross section in the external housing and a bushing stopper with a Christmas tree profile.

9. The rechargeable battery pack according to claim 1, wherein, in at least one of the two labyrinth wall structures of the double-labyrinth wall structure, an overlap length of the two side walls involved is greater than an overlap width which is perpendicular thereto.

10. The rechargeable battery pack according to claim 1, wherein, in at least one of the two labyrinth wall structures of the double-labyrinth wall structure, the two side walls involved overlap one another with a constant wall thickness.

11. The rechargeable battery pack according to claim 1, wherein the vertical use position is a position worn on the back.

12. The rechargeable battery pack according to claim 1, wherein the horizontal use position is a position docked to a tool.

13. A tool set, comprising:
a handheld power tool;
a rechargeable battery pack for supplying electrical energy to the hand-held power tool; and
a coupling unit for at least electrically coupling the rechargeable battery pack and the power tool, wherein the rechargeable battery pack comprises:
  an external housing which comprises a housing base and a housing hood, which is connected to said housing base and surrounds an interior space;
  a rechargeable battery cell block which is arranged in the interior space;
  a water discharge structure for discharging at least one of water contained in the interior space and water which enters the external housing from the outside, wherein the water discharge structure comprises at least one of:
(i) on at least one side of the external housing, a double-labyrinth wall structure which is open to liquid and has an outer labyrinth wall structure, which is formed by overlapping of an outer side wall of the housing base and an outer side wall of the housing hood, and an inner labyrinth wall structure, which is arranged offset in relation to the outer labyrinth wall structure in a direction facing the interior space and which is formed by overlapping of an inner side wall of the housing base and an inner side wall of the housing hood,
(ii) a discharge wall structure which comprises a housing wall structure of a component which is arranged in the interior space, wherein the housing wall structure contains, in the vertical or in the horizontal use position of the rechargeable battery pack, top-side housing wall parts which run in a direction downwards and to the outside from a separating line of the top-side housing wall parts, and
(iii) a labyrinth wall structure which is open to liquid and, in the vertical or the horizontal use position of the rechargeable battery pack, is formed, in a manner leading in a direction downwards and to the outside, between an electrical plug-in connection body, which is arranged on the side of the housing base, and a corresponding tool connection plug in a plugged-in position.

14. The tool set according to claim 13, wherein the handheld power tool is an electrically powered gardening or forestry tool.

15. A tool set, comprising:
a rechargeable battery pack for supplying electrical energy to hand-held power tools;
a harness device; and
a coupling unit for at least mechanically coupling the rechargeable battery pack and the harness device,
wherein the rechargeable battery pack comprises:
  an external housing which comprises a housing base and a housing hood, which is connected to said housing base and surrounds an interior space;
  a rechargeable battery cell block which is arranged in the interior space; and
  a water discharge structure for discharging at least one of water contained in the interior space and/or water which enters the external housing from the outside, wherein the water discharge structure comprises at least one of:
(i) on at least one side of the external housing, a double-labyrinth wall structure which is open to liquid and has an outer labyrinth wall structure, which is formed by overlapping of an outer side wall of the housing base and an outer side wall of the housing hood, and an inner labyrinth wall structure, which is arranged offset in relation to the outer labyrinth wall structure in a direction facing the interior space and which is formed by overlapping of an inner side wall of the housing base and an inner side wall of the housing hood,
(ii) a discharge wall structure which comprises a housing wall structure of a component which is arranged in the interior space, wherein the housing wall structure contains, in the vertical or in the horizontal use position of the rechargeable battery pack, top-side housing wall parts which run in a direction downwards and to the outside from a separating line of the top-side housing wall parts, and
(iii) a labyrinth wall structure which is open to liquid and, in the vertical or the horizontal use position of the rechargeable battery pack, is formed, in a manner leading in a direction downwards and to the outside, between an electrical plug-in connection body, which is arranged on the side of the housing base, and a corresponding tool connection plug in a plugged-in position.

16. The tool set according to claim 15, further comprising:
a handheld power tool and a coupling unit for at least electrically coupling the rechargeable battery pack and the power tool.

17. The tool set according to claim 16, where the handheld power tool is an electrically powered gardening or forestry tool.

* * * * *